United States Patent [19]
Bondini et al.
[11] 3,792,316
[45] Feb. 12, 1974

[54] PROTECTION DEVICE FOR A POWER ELEMENT OF AN INTEGRATED CIRCUIT

[75] Inventors: Arnaldo Bondini, Cesena; Bruno Murari, Monza, both of Italy

[73] Assignee: Societa'Generale Semiconduttori S.p.A., Milano, Italy

[22] Filed: Oct. 18, 1972

[21] Appl. No.: 298,676

[30] Foreign Application Priority Data
May 15, 1972 Italy .............................. 68512 A/72

[52] U.S. Cl. ........................ 317/31, 317/33 R, 323/9
[51] Int. Cl. ........................... H02h 9/02, H02h 9/04
[58] Field of Search ..... 317/33 VR, 33 R, 31; 323/9

[56] References Cited
UNITED STATES PATENTS

| | | | |
|---|---|---|---|
| 3,534,249 | 10/1970 | Neill et al. | 323/9 X |
| 3,548,294 | 12/1970 | Houghton | 323/9 X |
| 3,079,543 | 2/1963 | Decker | 317/33 VR |
| 3,182,246 | 5/1965 | Lloyd | 323/9 X |
| 3,335,361 | 8/1967 | Natale et al. | 317/33 VR |

*Primary Examiner*—A. D. Pellinen
*Attorney, Agent, or Firm*—Kaufman & Kramer

[57] ABSTRACT

A protection device for a power element of an integrated circuit. The main feature of this protection device is that of measuring the output current, directly on the calibrated wire of connection to the outside rheophore; such wire being inside the integrated circuit, processing the current and the output voltage across the power element so as to give a signal to a threshold circuit, which limits the output current.

8 Claims, 3 Drawing Figures

PATENTED FEB 12 1974 3,792,316

PROTECTION DEVICE FOR A POWER ELEMENT OF AN INTEGRATED CIRCUIT

BACKGROUND OF THE INVENTION

This invention relates to a protection device for a power element of an integrated circuit and, more particularly, for the protection of the final power transistors against short circuits on the outputs.

As is well known, the most simple system for protecting a power element of an integrated circuit consists in providing on the output a resistance in series with the load, with the result of limiting the output current to values such as not to damage the element to be protected. However, several drawbacks arise in this instance.

First of all, said resistance must be outside the integrated circuit because, if it where inside the same, the power dissipated thereby would cause a harmful heating of said circuit. The most serious disadvantages of this system is due, however, to the fact that said resistance in series with the load will not permit to have, on said load, the maximum power which the final element of the circuit would be able to deliver.

This drawback has been partly obviated by choosing a very low value for such resistance in series with the load and by drawing the voltage across the latter to bring said voltage, for instance, between the base and the emitter of a transistor or, at any rate, across a generic threshold element. In this manner, when the current reaches a level such as to cause, on the resistance, a voltage drop exceeding the threshold level, the transistor will start conducting, by maintaining constant the current flowing in the load. With this device, a protection against current surges is obtained and possibly, with a suitable voltage control, against power surges as well. The control of the maximum power borne by the transistor is generally attained by means of an element which is sensitive to the mean temperature of the silicon wafer. As a consequence, however, the circuit can be likewise liable to become damaged, inasmuch as the final transistor to be protected might operate in the so-called second breakdown zone, i.e., in a zone of the cartesian diagram of the output characteristics, comprised between the curve of the maximum dissipable power and a curve of lower level which depends on the structure of the transistor; in said zone, for voltages high enough, local heatings arise in the transistor, which cause distruction of the latter. Further, it has to be borne in mind that, upon variation of the ambient temperature, by varying the maximum dissipable power and, therefore, the maximum current which can be borne by the circuit, the actuation of the protection device should occur at different threshold values, which depend on the ambient temperature. This is not the case with the known protection devices. Even in the protection devices of the kind just described, there still remains the disadvantage of having, in series with the load, a resistance which causes a loss of useful power.

The object of the instant invention is to provide a protection device which enables avoidance of the disadvantages enumerated above and, in particular, a device of the kind referred to which will not dissipate any useful power, is of simple construction and, therefore, inexpensive, which can be inserted inside the integrated circuit and will thereby protect the latter from all the possible causes of damage.

SUMMARY OF THE INVENTION

According to the present invention it is provided a protection device for a power element of an integrated circuit, whose output current is carried to a connection outside rheophore through a calibrated wire inside said circuit, comprising:

means for measuring the current delivered by the power element, directly on said calibrated wire.

BRIEF DESCRIPTION OF THE DRAWINGS

For a better understanding of the present invention, one particular embodiment thereof will now be described, merely by way of non-limiting example, with reference to the accompanying drawings, wherein.

DETAILED DESCRIPTION OF THE INVENTION

Figure 1:
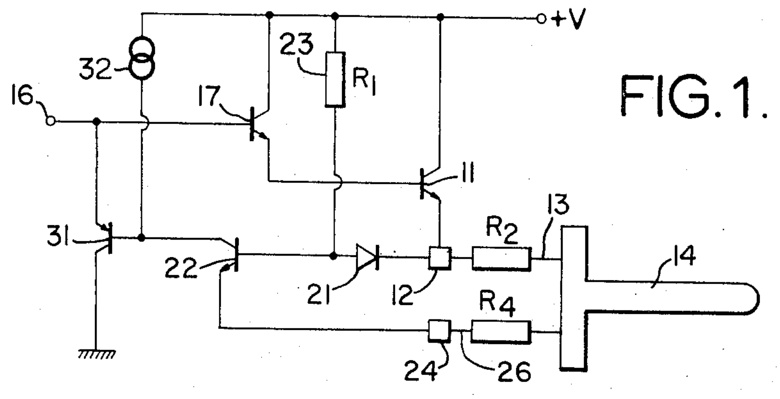
FIG. 1 shows the wiring diagram of the final portion of an integrated circuit and of the protection device according to the present invention, which has the purpose of protecting said circuit.

In FIG. 1, there is indicated at 11 a final power transistor of an integrated circuit which is fed with a voltage $+V$ on its collector. The emitter of this transistor is connected with a metallized element 12 of the integrated circuit, from which an electric conductor or lead 13 extends, normally present in an integrated circuit, and of gold or aluminium, for connection with an outer rheophore 14.

The conductor 13 has a distributed resistance whose overall value is $R_2$, which can be easily determined in a most accurate manner, inasmuch it comprises a wire whose dimensions (i.e., diameter and length) have close tolerances. For better clearness, the overall resistance $R_2$ of the conductor 13 is shown as a concentrated resistance in FIG. 1.

The signal to be amplified in power, coming from an input 16, will reach the base of the transistor 11 after having been amplified in current by a transistor 17, the latter being fed, in turn, to the collector by the voltage $+V$ and having its emitter connected with the base of the power transistor 11.

The metallized element 12 is further connected, through a diode 21, with the base of a transistor 22 which is biased, through a resistor 23 of value $R_1$, by the voltage $+V$. The emitter of the transistor 22 is connected with another metallized element 24 which is connected, in turn, with the output rheophore 14 through an electric conductor or lead 26, having a distributed resistance of overall value $R_4$ which has been depicted as concentrated in FIG. 1 for reasons of clearness.

Said resistance $R_4$, which is of a very low value, of the same order of magnitude as $R_2$, represents the indispensable galvanic connection between the emitter of the transistor 22 and the end of $R_2$ in the connection point with the output rheophore 14.

Finally, the collector of the transistor 22 is connected with the base of a transistor 31, which base is connected with a generator of constant current 32, connected in turn to the voltage $+V$. Finally, the emitter of the transistor 31 is connected with the input 16, while its collector is grounded.

The operation of the circuit described above is as follows.

Figures 2, 3:
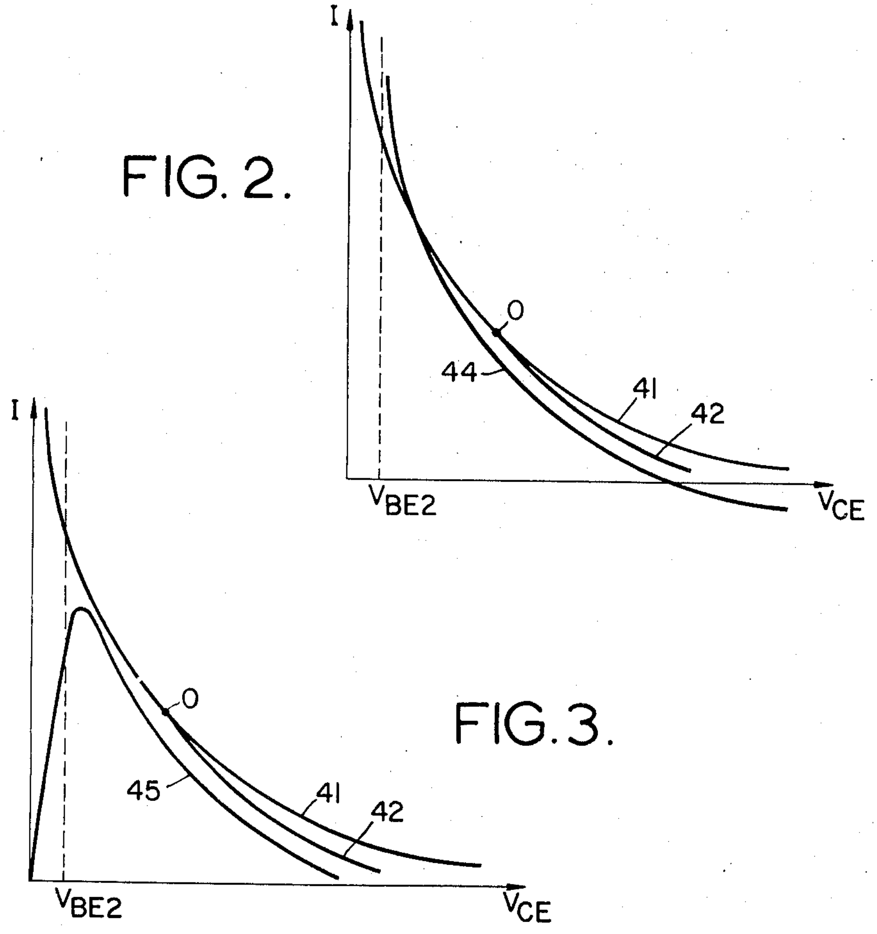
FIG. 2 shows a diagram of the theoretical protection curve attainable by means of the device of the invention.
FIG. 3 shows a diagram of the actual protection curve obtainable by means of the device of the invention.

In FIG. 2, on a cartesian diagram with the voltage $V_{CE}$ present between the collector and the emitter of the transistor 11 on the abscissae, and the current I on the ordinates, i.e., the current flowing through the collector of said transistor, there is shown a curve 41 of the maximum power which can be dissipated by the same transistor. This curve is one branch of a hyperbola whose asymptotes are the coordinate axes, namely a curve which is the locus of the points $VI$ = constant. As already stated, voltages $V_{CE}$ high enough will give rise to local heatings in the transistor, which can even destroy the latter. The zone of the diagram wherein these phenomena can occur is comprised between the curve 41 and a second breakdown zone defining curve 42 whose distance from the curve 41 increases upon increase of the voltage $V_{CE}$. It will be apparent that an ideal protection will be attained when the working zone of the transisotr 11 is comprised solely in the area underneath the curves 41 and 42, although being it possible to approach the latter as much as possible in order to take the maximum advantage from the power obtainable from said transistor.

Now, by indicating with $I_{C1}$ the current flowing through the collector of the transistor 22, with $I_{C2}$ the current in the diode 21, normally obtained by shorting the base and the collector of a transistor, whereby the voltage across the latter will be coincident with that localized on the base-emitter junction of the original transistor, and by neglecting the currents in the control circuits with respect to the power current $I$ (collector current of the transistor 11), which will exceed the former by at least two orders of magnitude, as well as the base currents with respect to the collector currents, then we can write:

$$I_{C1} = I_{S1}\ exp\ [qV_{BE1}/KT] = A_1\ I_S\ exp\ [qV_{BE1}/KT] \quad (1)$$

$$V_{BE1} = V_{BE2} + R_2 I \quad (2)$$

$$I_{C2} = A_2 I_S\ exp\ [qV_{BE2}/KT] = (V_{CE} - V_{BE2})\ /\ R_1 \quad (3)$$

wherein:

$R_1$, $R_2$, $V_{CE}$, $I$, $I_{C1}$ and $I_{C2}$ have the meanings defined above, whereas:

$I_S$ is the inverse saturation current for unit of area of the base-emitter junction, depending on the technologic process and, therefore, identical for all the transistors of the same kind present in the integrated circuit;

$A_1$ is the emitter area of the transistor 22;

$A_2$ is the junction area of the diode 21;

$V_{BE1}$ is the base-emitter voltage of the transistor 22;

$V_{BE2}$ is the junction voltage of the diode 21;

$q$ is the charge of the electron;

$K$ is the Boltzmann constant;

$T$ is the absolute temperature of the junctions.

From Eq. (1), we deduce:

$$I_S = I_{C1}/A_1 \cdot exp\ [-qV_{BE1}/KT]$$

which, substituted in Eq. (3), gives the relation:

$$A_2\ I_{C1}/A_1 \cdot exp\ [-qV_{BE1}/KT\ ] \cdot exp\ [qV_{BE2}/KT\ ] = (V_{CE} - V_{BE2})\ /R_1$$

from which we obtain:

$$A_2/A_1 \cdot I_{C1}\ exp\ [q/KT \cdot (V_{BE2} - V_{BE1})] = (V_{CE} - V_{BE2})/R_1 \quad (4)$$

From Eq. (2) we obtain then the relation:

$$V_{BE2} - V_{BE1} = -\ R_2 I$$

which, upon substitution in Eq. (4), becomes:

$$A_2/A_1 \cdot I_{C1}\ exp\ [(-qR_2I)/KT] = (V_{CE} - V_{BE2})\ /\ R_1$$

from which we obtain:

$$A_2/A_1 \cdot I_{C1} = (V_{CE} - V_{BE2})/R_1 \cdot exp\ [qR_2I/KT\ ]$$

and, therefore:

$$exp\ [q\ R_2I/KT] = (A_2/A_1 \cdot I_{C1}R_1)\ /(V_{CE} - V_{BE2})$$

obtaining finally $$I = KT/qR_2 \cdot ln\ [(A_2/A_1 \cdot I_{C1}R_1)\ /(V_{CE} - V_{BE2})] \quad (5)$$

This relation binds the output current I to the output voltage $V_{CE}$ of transistor 11 and, for constant values of all the other parameters, it may therefore be represented in the cartesian diagram of the output characteristics of said transistor. Therefore, the variation of one of said parameters will give a whole family of curves of the exponential type.

Therefore, $I_{c1}$ will be assumed as the variable parameter, as the others may be, with a good approximation, considered as constant.

Further, indicating by $I_T$ the value of $I_{c1}$, to which corresponds an exponential curve 44 (FIG. 2) which best approaches the lower section of curves 41 and 42, therefore expressed by the following relation:

$$I = KT/q\ R_2 \cdot ln\ [(A_2/A_1 \cdot I_T R_1)\ /(V_{CE} - V_{BE2})] \quad (6)$$

It has been observed experimentally that, since the current $I$ cannot become negative and, on account of the saturation of the power transistor 11, during the operation of the device, an exponential curve 45 (FIG. 3) is obtained, whose behaviour, once the variables of the circuit of FIG. 1 have been suitably adjusted, approaches quite satisfactorily the curve comprising the section of curve 41 whose points have abscissae lower than those of the point O (FIG. 2), and the curve 42.

The circuital connection of diode 21, transistor 22 and resistor 23, together with conductors 13 and 26 and transistor 11 is therefore such as to provide (according to the developed analytical relations) an input signal $I_{c1}$ to the collector of transistor NPN 22 which is a function of both the current flowing through the conductor 13 and hence the output current of transistor 11, and the output voltage across same transistor 11. For each value of current $I_{c1}$, the operating point of transistor 11 is then on a curve, of the family of curves, having a shape substantially similar to that of curve 44.

More particularly, when current $I_{c1}$ exchanged with the threshold circuit, comprising transistor 31 and the constant current generator 32, is lower than the value of the reference current $I_T$, from the constant current generator 32, then the protection device remains inactive. That part of the current $I_T$ which is exceeded with respect to current $I_{c1}$ sent to transistor 22 is sent to ground through the base/collector junction of transistor 31. Transistor PNP 31, remains therefore inactive and the whole signal present at input 16 is transferred to the output 14.

When, on the contrary, the current $I_{c1}$ drawn by transistor 22 due to an increase of the output voltage or current of transistor 11, exceeds current $I_T$, the exceeding part of current $I_{c1}$ is applied to transistor 31, which is therefore activated and hence a part of the signal present at the input 16 is shunted to ground through the transistor 31, reducing the overall power delivered by transistor 11 and practically preventing the output current I from exceeding the limit value allowed by relation (6). Any increase of the output voltage of transistor 11, while keeping nearly constant the voltage across diode 21, which is always conducting will cause an increase in current through resistance $R_1$ and hence a current increase in the base of transistor 22. Any increase of the output current of transistor 11 will cause an increase of the base current of transistor 22 through the circuit including the conductor 26. As a result of one or the other or of both of said causes, there is an increase of the base current of transistor 22, and therefore an increase of the collector current $I_{c1}$ of transistor 22 until it attains the limit value $I_T$, allowing the activation of transistor 31 and consequently limiting to allowable values below curve 45 the power dissipated by the final transistor 11.

A secondary drawback of the practical realization of the device according to the present invention might arise from the fact that the production tolerance of the resistances of the integrated circuits is very wide, i.e., in the order of ±20 percent. This disadvantage can be overcome by realizing, in a manner known per se, a threshold circuit such as to give a constant current:

$$I_T = V_R / R_3$$

wherein $V_R$ is the voltage of a Zener diode or the base-emitter voltage of a transistor, and $R_3$ is the resistance (not shown) through which the current $I_T$ flows. By substituting this value of reference current in Eq. (6), we obtain:

$$I = KT/qR_2 \cdot ln\ [(A_2/A_1 \cdot R_1/R_3 \cdot V_R\ ) /(V_{CE}-V_{BE2})] \quad (7)$$

This relation depends upon the ratios $A_2/A_1$ and $R_1/R_3$, which can be obtained with small values of working tolerances.

Furthermore, the operation of the threshold circuit can be arranged so as to "lock" the output current $I$ when the temperature of the element to be protected exceeds a predetermined value; this can be obtained, for instance, by annulling the reference current $I_T$ for said maximum temperature value.

From the above description, it will be apparent that the device in accordance with the present invention is adapted to solve the technical problems proposed.

In fact, by measuring the current directly on the conductor 13, without adding any outer resistance, no dissipation of useful power will occur and, therefore, the circuit can be fully utilized. Moreover, the curve 45 — obtained by processing the magnitudes under control — permits to attain an ideal protection of the integrated circuit, by not allowing the same to operate in a zone external either to the curve of maximum dissipable power 41 or to the curve 42, but permitting to the element of said circuit to be protected to operate in lower zones in immediate proximity of said curves and, therefore, to substantially realize an optimum utilization of the same circuit.

What we claim is:

1. A protection device for a final power element of an integrated circuit responsive to an input signal, wherein the curve of the maximum power dissipatable by said element is given by one branch of a hyperbola whose asymptotes are the coordinate axes and the curve of limitation of the second breakdown zone of said final power element, said curve of limitation being lower than said curve of maximum power, the distance between said two curves increasing with the increase of the voltage present at the output of said element, comprising: a calibrated wire inside said integrated circuit to lead the output current of said final element to an external connecting rheophore; first means for detecting the output voltage value of said final element and the output current value in said calibrated wire for providing a composite input current, said output current value being determined through the measurement of the voltage value across said wire and providing said composite input current with a parametric exponential relationship, between said output voltage and current, the variation of at least one of said parameters giving rise to a family of exponential curves, and one of said parameters being said input current of said first means; and a threshold circuit comprising second means to generate a constant reference current, third means applying said constant reference current to the base of a first transistor, fourth means connecting the emitter/-collector path of said first transistor between the input of said integrated circuit and ground, said first transistor responsive to said input current sensed by said first means attaining the value of said constant reference current, to bypass a part of said input signal and to thereby limit the operating point of said final element to a zone delimited by the one of said exponential type curves, among all the curves of said family, which is lower than said maximum power curve and said second breakdown zone limiting curve, said curve of the exponential type being determined, with the other constant parameters, by the value of the parameter corresponding to said input current which is coincident with the value of said reference current.

2. Protection device according to claim 1, wherein said first means comprises: a series resistor and diode, parallel connected across said final power element; and a further transistor having its base connected to the connection between said resistor and said diode, its emitter connected to said external rheophore and its collector connected to said base of said first transistor.

3. Protection device according to claim 1, wherein at least one of said parameters of said exponential relationship is obtained as a high precision ratio between values of components of the same type as said first means.

4. Protection device according to claim 1, wherein at least one of said exponential parameters is variable as a function of the temperature, the variation of said parameter dependent upon a variation of said exponential curve which corresponds to the value of said constant reference current, thereby compensating the variations in said curve of maximum power and said second breakdown zone limiting curve which occur because of said temperature variation.

5. A power dissipation protection circuit for a final power element, operable in accordance with a maximum power curve, of an integrated circuit including an input current line and an output current line, comprising first means coupled to said output current line for sensing the current through said final power element and providing a first signal corresponding thereto, second means coupled to said final power element for sensing the voltage across said final power element and providing a second signal corresponding thereto, third means coupled to said first and second means and responsive to said first and second signals to provide a current condition in said third means in accordance with said first and second signals, said current condition representative of an operating point on said power curve of said final power element, a source of reference current, a threshold circuit, said threshold circuit coupled to said input line and to said third means and responsive to said current condition of said third means in excess of said reference current for bypassing a portion of the input current on said input current line, thereby preventing said final power element from exceeding said limitations defined by said power curve.

6. The combination of claim 5 wherein said final power element is a transistor and said third means is a transistor, said third means transistor including a diode coupling its base to the emitter of said final power element transistor, said second means including a resistance coupled between the collector of said final power element transistor and the base of said third means transistor, and said first means includes a resistance coupling the increase in current flow along said output line to the emitter of said third means transistor.

7. The combination of claim 5 where said threshold circuit includes a transistor having its emitter/collector path coupled between said input current line and a common point, said source of reference current having its current output coupled to the base electrode of said threshold circuit transistor.

8. The combination of claim 5 wherein said source of reference current varies in accordance with temperature, thereby regulating said final power element in accordance with temperature variation.

* * * * *